May 21, 1940.　K. Y. CHENG　2,201,847

TRANSMISSION

Filed March 7, 1939　　2 Sheets-Sheet 1

INVENTOR.
BY Kuo Yu Cheng
Word & Ward ATTORNEYS

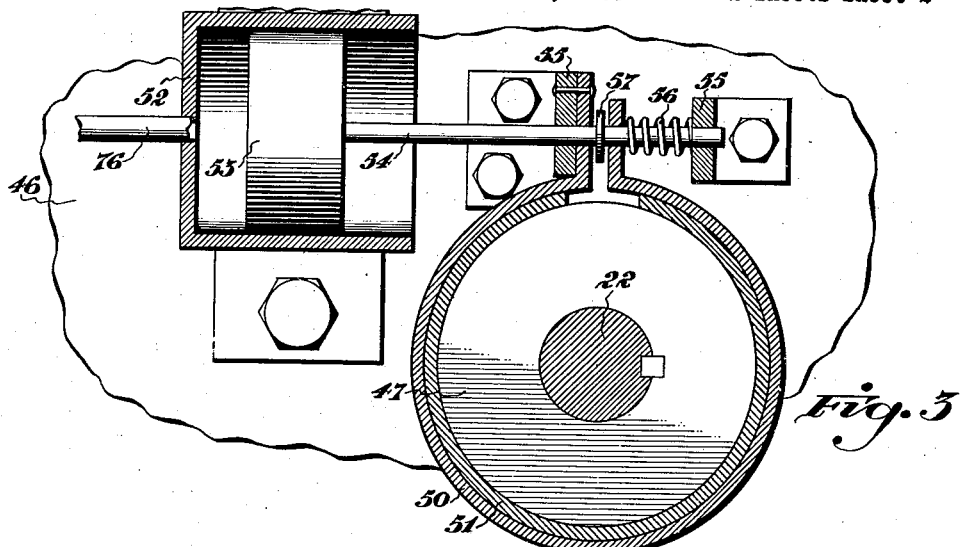
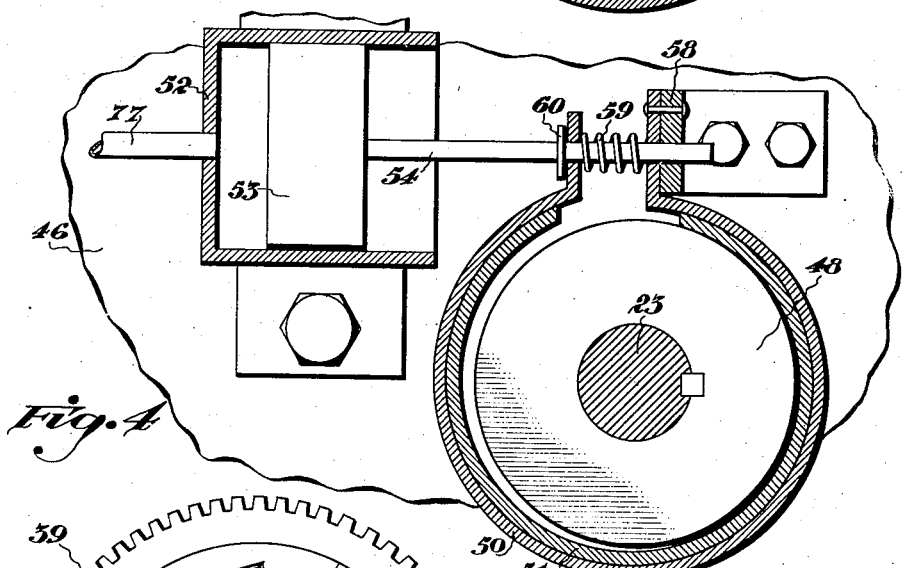
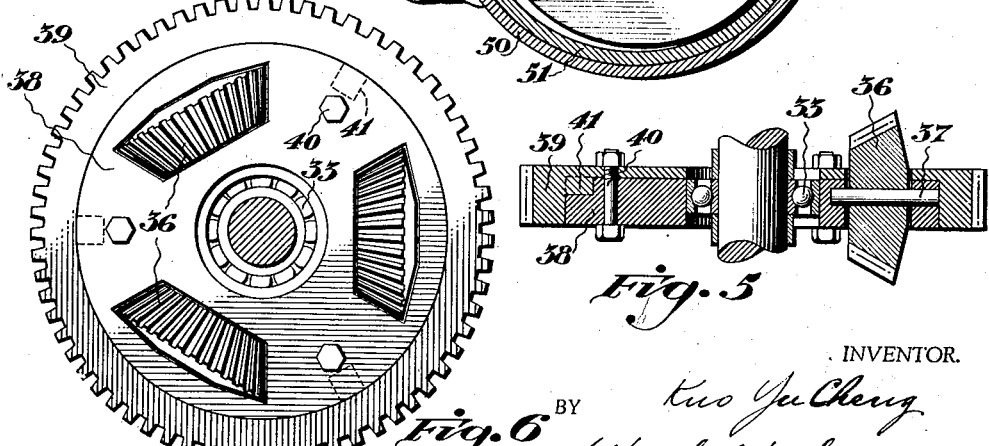

Patented May 21, 1940

2,201,847

UNITED STATES PATENT OFFICE 2,201,847

TRANSMISSION

Kuo Yu Cheng, Cincinnati, Ohio

Application March 7, 1939, Serial No. 260,372

10 Claims. (Cl. 74—260)

This invention relates to variable speed power transmission mechanism and is particularly directed to a transmission mechanism of semi-automatic character. More particularly, the invention concerns transmissions of that type, for example, as used in motor cars where it is desirable to have the forward speeds or gear ratios changed automatically as demanded by road conditions.

In the first place, it has been the object of the present inventor to provide a transmission of this character which only involves three gear shifts, namely, neutral, forward, and reverse. It is realized that automatic and semi-automatic transmissions are not new, but, in this invention, the objective has been simplification of the mechanism, the utilization of constantly meshing gears, the adaptation of epicyclic differential gearing, and the application of pressure means for causing the forward speed shifts at the proper speeds.

More particularly, the present invention employs a planetary or epicyclic type of driving mechanism using hydraulic means for the purpose of establishing the driving connection with the hydraulic pressure supplied by virtue of the power transmission within the mechanism itself. Therefore, the present inventor has produced a speed change means in which the speed change can be obtained smoothly and without jar to the driving train, by means of hydraulic pressure, varied by increase or decrease of pressure, brought about by change of speed. The hydraulic arrangement affords convenient and easy facilities for adjusting the selector means, wherein the changes take place at the proper speeds.

The construction, herein disclosed, provides for safer driving since the driver is not concerned with the changing of gears when the car is in motion. The mechanism brings about a more economical operation of the automobile, since the power is continually transferred, and greatly lessens the amount of wear of the parts themselves, such as the clutch since it is used less and both the engine and clutch, since they are not subjected to sudden strains brought about primarily by careless use of the clutch and failure to change gears when necessary.

Other objects and certain advantages will be more fully apparent in a description of the accompanying drawings in which:

Figure 3 is a sectional view taken on line 3—3, Figure 1, illustrating the braking device for low speed.

Figure 4 is a sectional view taken on line 4—4, Figure 1, illustrating the braking device for second and high speeds.

Figure 5 is a sectional view taken diametrically of one of the gears, showing its structure in detail.

Figure 6 is a face view of the gear of Figure 5.

Figure 1:
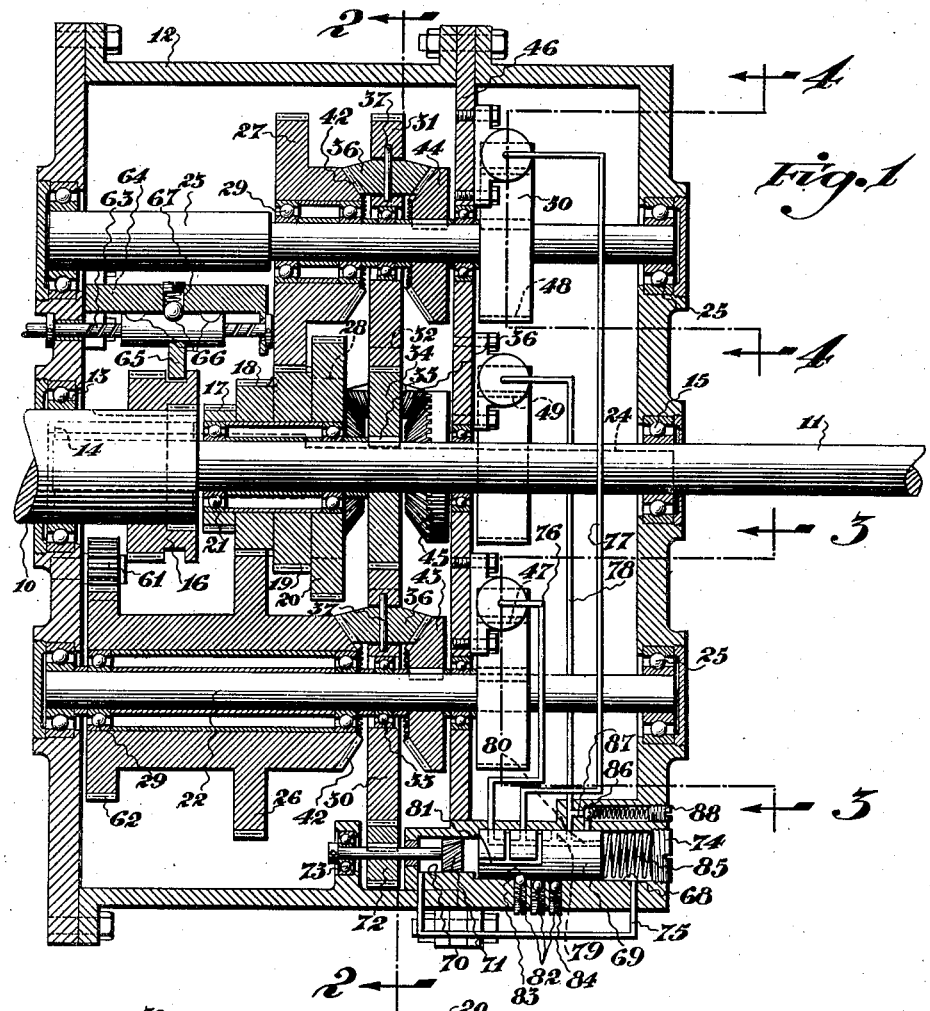
Figure 1 is a sectional view taken longitudinally through the improved transmission of this invention.
Figure 2:
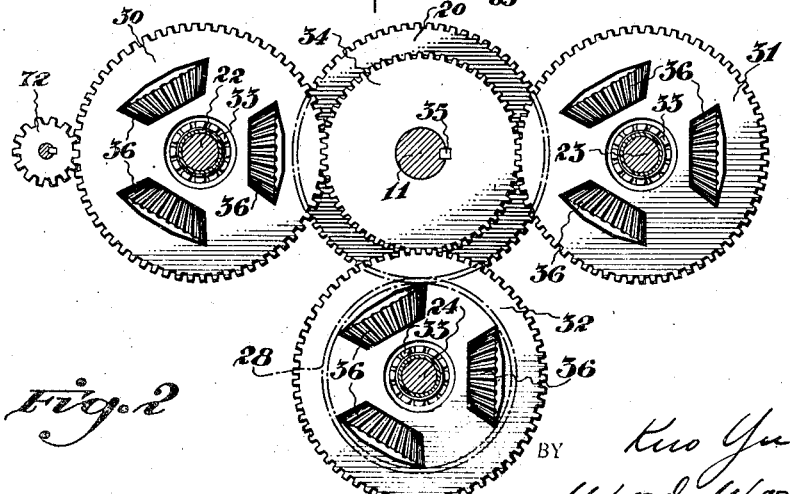
Figure 2 is a sectional view taken on line 2—2, Figure 1, showing the arrangement of the shafts and gears.

In the embodiment of the invention, disclosed herein, the drive shaft is indicated at 10 and the driven shaft at 11. The rear end of the drive shaft, as shown, projects into the transmission casing 12 and is journalled in ball bearing 13. The driven shaft has its forward end telescoped into an axial bore in the rear end of the driving shaft and is suitably journalled therein on a set of roller bearings 14. A suitable clutch (not shown) may be provided for controlling the connection of the power source to the driving shaft. The driven shaft 11 passes through the rear wall of the housing and is additionally supported in ball bearing 15. A coupling element 16 for forward drive is slidably mounted, in splined connection, upon the driving shaft. This element provides internal clutch teeth, adapted to engage with the teeth of the spur gear 17. The gear 17 is one of a cluster of gears, the others of which progressively increase in diameter and are indicated at 18, 19 and 20. These gears are fixed together to rotate freely as a unit upon ball bearings 21, mounted on the shaft 11.

Three countershafts, namely, 22, 23 and 24, are provided. These shafts, which are disposed parallel to the driven shaft, are, in each instance, mounted in the front and back walls of the casing in ball bearings 25. Each of these shafts has a gear, respectively, gears 26, 27 and 28, loosely rotatably mounted thereon on ball bearing assemblies, indicated at 29. Gear 26 is component to and constantly meshes with gear 18, gear 27 with gear 19, and gear 28 with gear 20. Also, adjacent to and at the rear of each of the gears 26, 27 and 28 are driving gears 30, 31, and 32 respectively, which are loosely mounted for free rotation on ball bearing assemblies 33 on their respective shafts. These last named gears form part of the differential gear assemblies. All of them are constantly in mesh with the central gear 34, keyed to a driven shaft by means of a key 35.

Each of the gears 30, 31, and 32 carries a set of small planetary bevel gears 36, three in each instance. These bevel gears are journalled on pins 37, disposed radially in the body portions 38 of the respective gears. The bores, which receive the pins, extend inwardly radially from the periphery of the gear body so that the pins may be drawn outwardly when it is desired to remove the planetary gears 36. The gear element is recessed and provides a flange 39 overhanging the periphery of the body portion 38 and thus locks the pins in position. The gear body and gear elements are held together by means of bolts 40. Lugs 41, formed at spaced intervals around the inside of the gear, engage in notches in the body and prevent the parts from rotating one upon the other.

Each of the gears 26, 27, and 28 provides bevel gear teeth on the rear end of its hub. These bevel teeth 42 mesh with the teeth of the small planetary bevel gears. Coupling elements 43, 44, and 45 are keyed to the respective shafts 22, 23, and 24 and are also in mesh with the adjacent bevel gears of the respective differential driving gearing. A supporting plate 46 is bolted between the front and back sections of the casing and divides the casing into two compartments. Just in back of this plate 46 and keyed to the respective shafts 22, 23, and 24 are brake drums 47, 48, and 49.

A hydraulically operated braking unit is provided for each drum. Each of these units consists of a braking band 50, a lining 51, a cylinder 52, mounted on the plate 46, a piston 53 including a rod 54, for clamping or releasing the brake band as the case may be. In the instance of the lower assembly, that is, the one controlling low speed gear 30, the brake is normally in drum clamping position. Spaced abutments 55 are provided on the plate 46 and one arm of the brake band is fixed to one of these lugs 55. The rod 54 is slidably journalled in the lugs. A coil spring 56 is disposed between the other lug 55 and the other arm of the brake band about the rod 54, thus tending to draw the band tightly upon the drum in the braking position. The rod includes a shoulder 57 disposed between the arms of the brake band and adapted to force one arm away from the other against the force of the spring.

In the instance of the other two braking units, a single lug 58 is provided and one arm of the brake band is fixed to this lug. The actuating rod is journalled in the lug and supports the other arm of the brake band. A coil spring 59 is disposed between the arms of the brake band, constantly forcing the arms apart. A shoulder 60 on the rod engages the free arm of the brake band and compresses the spring when the piston is actuated for braking. The oil alternately enters and is discharged from the back of the cylinder through a single conduit in the instance of each braking unit.

As shown, the transmission is in neutral. The coupling element 16 is disposed between the gear 17, which is the main forward drive gear, and the idler gear 61, which is in mesh with the gear 62, formed integrally with the gear 26 for reverse direction of drive. The shifting of the element 16 is accomplished by means of a screw-threaded rod 63, journalled in the wall of the transmission casing and in a bracket 64. This rod is fixed against axial movement and has a shift yoke 65 in screw-threaded engagement thereon, engaging a groove of the element 16. The hub of the yoke includes three notches 66 respectively for forward, neutral, and reverse. A detent 67 is mounted in the bracket 64 and provides a ball adapted to engage with any of the respective groups. The rod 63 may be actuated from any point, for example, the driving compartment, if the transmission is part of a motor car.

An automatic selector unit is provided in the base of the casing. A lug is formed in the base of the casing and is machined to provide a bore 68 in which a piston type valve 69 is movable. The forward end of the bore is counterbored to provide a pumping chamber 70 and a pumping element 71 is included therein. The shaft for the pumping element carries a gear 72 in mesh with the low speed gear 30 and driven therefrom. The shaft is journalled in a ball bearing 73 in a lug of the casing and in the end wall of the pump chamber. The rear end of the chamber is closed by means of a plug 74. The pump is effective for drawing the oil from the forward end of the cylinder through a conduit 75 between the pump chamber and the forward end of the cylinder.

The selector valve is automatically moved to any one of three positions effective for low, intermediate or second, and high speeds. The oil is exhausted from the various braking cylinders through the conduits 76, 77, and 78, which also supply the fluid. Exhaust takes place through exhaust passageways 79 in the valve body 69, delivering into a main exhaust passageway 80 leading to the rear end of the cylinder. The oil is delivered to these conduits through passageways 81 extending from the forward end of the valve to the periphery thereof. Three detents 82 are provided, one for each position of the valve, and the valve includes a groove 83 for alternately engaging the detents. Each detent has a separate adjustment screw 84, so that the pressure of the detent may be varied to control the movement of the automatic valve as the speed picks up.

A coil spring 85, under pressure between the plug 74 and the rear end of the valve, provides a general resistance to the movement of the valve, which, as stated, may be finely varied by adjusting the detents. A check valve 86 is provided and is disposed in a passageway 87 between the high speed braking cylinder and one of the exhaust passageways 79. This spring pressed unloader valve 86 is effective for relieving any unnecessary oil pressure and operates to by-pass or recirculate the oil. The pressure of this check valve is regulated by means of an adjustable plug 88.

Operation

Assuming that the coupling element 16 has been moved to forward speed, that is, with its gear teeth meshed with the teeth of gear 17, the drive will take place as follows: coupling element 16, gear 17, gears 18 and 26, gear 30 to gear 34. Low speed control drum 47 is normally clamped and will remain so until the speed picks up. More specifically, the drive takes place through gear teeth 42 of the hub of gear 26. These drive the planetary gears 36 and the gears 36 drive the gear 30 as they are meshed or roll around the teeth of the fixed bevel gear 43. In other words, the axes of the gears 36 move around relative the circumference of the fixed bevel gear 43 which acts in the manner of a fixed rack. Now as the speed increases and increased pressure is developed in the forward chamber of the automatic valve, the valve is moved rearwardly from the low speed detent to the intermediate speed detent. With the valve in this position, the oil is delivered through conduit 76 to the braking device 47 where it is effective for releasing this brake. The oil is also delivered through a passageway 81 and conduit 77 to braking device 48. Here it is effective for exerting a braking action on the device 48. Since the brake drum of the upper shaft 23 is clamped, the shaft and the element 44 will likewise be clamped. The drive will then proceed through gears 16, 17, 19, 27, 31 and 34, since the small pinions of gear 31 are in mesh with the fixed element 44.

When the shift has been made and the speed again picks up, the pump will again develop a pressure effective for moving the automatic valve to the third detent. Thereupon, the oil will be delivered through pipe 78 to the braking unit 49 and exhaust from the braking unit 48 through pipe 77 and exhaust passageways 79 and 80. It will, of course, be realized that, during these conditions, the low speed braking device is held out of braking contact by virtue of the oil pressure in line 76 leading to braking unit 47. Now, with the element 45 fixed in position, the high speed drive takes place through gears 16, 17, 20, 28, 32, and 34 to the driven shaft 11.

Greater fluid pressure, due to higher speed at this point, does not push the selector valve any further but is transmitted to the piston of the braking cylinder 47, which releases gear 30, and to the piston of braking cylinder 49, for causing rotation of gear 32. Also, as stated, any excess of pressure is relieved through the unloader valve 86. As the driving speed tends to become lower, the movements of the automatic valve are reversed.

Having described my invention I claim:

1. In a transmission of the class described, a shaft to be driven, a gear fixed on said shaft, loosely mounted planetary gear elements constantly meshing with said fixed gear, each of said planetary gear elements carrying planetary bevel gears with their axes radially disposed, a loosely mounted bevel gear meshing with each set of planetary bevel gears, gears driven at different speeds also respectively meshing with said planetary gears, means for driving said last named gears at respectively different speeds, hydraulically actuated clamping means for seizing and releasing said loosely mounted bevel gears in a predetermined order, means for supplying fluid pressure, said means driven by said driving means when said gears are being driven, and a valve controlling the application of said fluid pressure to said hydraulically actuated clamping means, said valve automatically movable depending on the speed imparted to the driven gear.

2. In a transmission, a driving shaft, a driven shaft, a cluster of gears loosely mounted on said driven shaft, a shiftable coupling element on said driving shaft, a reversing gear, means for shifting said coupling element from neutral to position of engagement with either the cluster of gears or the reversing gear, a low speed gear meshing with one of the gears of said cluster and carrying a gear meshing with the reversing gear, intermediate and high speed gears meshing with the other of said gears of the cluster, a gear to be driven, a respective planetary gear system for coupling each of said low, intermediate, and high speed gears to the gear to be driven, each of said systems including a gear element capable of idling and hydraulic means for selectively seizing the idling gear elements and causing either the low, intermediate or high speed gears to be applied to the driven gear.

3. In a transmission, a set of gears of different diameters, means for driving said gears, component gears meshing with said gears of different diameters, a gear to be driven, a planetary gear element interposed between each of said component gears and meshing with said gear to be driven, planetary gears carried by said planetary gear elements and meshing with teeth formed at the hubs of the respective component gears, further gears meshing with said planetary gears, hydraulically operated braking means for selectively seizing said further gears of each planetary gear element depending on the pressure developed in the fluid system for causing rotation of the particular gear of the planetary system and, therefore, driving the driven gear.

4. In a transmission, a set of gears of different diameters, means for driving said gears, component gears meshing with said gears of different diameters, a gear to be driven, planetary gear systems interposed between each of said component gears and said gear to be driven, a fluid pressure system driven by the driving shaft, hydraulically operated braking means for selectively seizing a member of each planetary gear system depending on the pressure developed in the fluid system for causing rotation of the particular gear of the planetary system and, therefore, driving the driven gear.

5. In a transmission, a driving shaft, a driven shaft, a gear fixed to said driven shaft, gears constantly meshing with said gear fixed to said driven shaft, respective speed change gears for driving said last named gears, gears component to said last named gears driven by said drive shaft and constantly meshing with said last named gears, each of said first named gears including planetary gears normally in idling mesh with said speed change gears, a further gear for each first named gear in constant mesh with the planetary gears and adapted to loosely rotate, hydraulic means for selectively clamping said further gears in position whereby a rotative action may be imparted to said first named gears through said planetary gears, a fluid pump driven by the largest of said component gears, said pump delivering fluid to said hydraulic means, and a valve shifted by increased fluid pressure for controlling the hydraulic means and operating said means in a predetermined order.

6. In a transmission, a driving shaft, a driven shaft, a gear fixed to said driven shaft, planetary gear elements constantly meshing with said gear fixed to said driven shaft, respective speed change gears driving said last named gears, gears component to said last named gears driven by said drive shaft and constantly meshing with said last named gears, each of said planetary gear elements including planetary gears normally in idling mesh with said speed change gears, a further gear for each planetary gear element in constant mesh with the planetary gears, and adapted to loosely rotate, hydraulic means for selectively clamping said last named gears in position whereby a rotative action may be imparted to a selected planetary gear element, and an automatically shifted selector means for clamping the respective further gears, said selector means actuated by hydraulic pressure developed by means driven from said driving shaft.

7. In a transmission, a cluster of gears of different diameter, means for driving said cluster of gears, component gears driven by the respective gears of said cluster, a gear to be driven, each of said planetary gear units separately and independently in constant mesh with said gear to be driven, said gear units including an element adapted to idle, and hydraulic means for selectively seizing said idling elements and causing said planetary gears to impart a rotative motion to the driven shaft.

8. In a transmission, a driving shaft, a driven shaft, a gear fixed to said driven shaft, gears of different diameters interposed between said driving shaft and said driven shaft, means for coupling the driving shaft to said gears of different diameters, component gears driven by the gears of different diameters, a fluid pump driven by one of said component gears and, devices for respectively coupling the gears of different diameters to the gear fixed on the driven shaft, said devices operated by said fluid pump as the pressure rises to a predetermined point.

9. In a transmission, a driving shaft, a driven shaft, a cluster of gears of different diameter, loosely mounted on the driven shaft, means for coupling the driving shaft to said cluster of gears, component gears driven from the respective gears of said cluster, a gear on the driven shaft, separate and independent planetary gear units in constant mesh with said gear on said driven shaft, and hydraulic means for selectively causing said planetary gears to impart a rotative motion to the driven shaft.

10. In a transmission, a driving shaft, a driven shaft, a gear fixed to said driven shaft, speed change gears of different diameters interposed between said driving shaft and said gear on said driven shaft, means for coupling the driving shaft to said gears of different diameters, a fluid pump driven through said gears of different diameters, hydraulically operated devices connected to said fluid pump, and a pressure operated selector valve in said fluid pump automatically selectively operating said hydraulic operated devices for causing transmission of power through a respective gear of the gears of different diameters to the gear on the driven shaft as the fluid pressure increases.

KUO YU CHENG.